(12) United States Patent
Durlach

(10) Patent No.: US 6,807,367 B1
(45) Date of Patent: Oct. 19, 2004

(54) DISPLAY SYSTEM ENABLING DYNAMIC SPECIFICATION OF A MOVIE'S TEMPORAL EVOLUTION

(76) Inventor: David Durlach, 11 Miller St., Somerville, MA (US) 02143

( * ) Notice: Subject to any disclaimer, the term of this patent is extended or adjusted under 35 U.S.C. 154(b) by 0 days.

(21) Appl. No.: 09/476,402

(22) Filed: Jan. 2, 2000

Related U.S. Application Data

(60) Provisional application No. 60/114,518, filed on Jan. 2, 1999.

(51) Int. Cl.[7] .............................................. H04N 5/781
(52) U.S. Cl. ........................ 386/125; 386/95; 725/141
(58) Field of Search .............................. 386/46, 52, 55, 386/85, 95, 120, 125, 126; 725/41, 141, 131, 151, 153

(56) References Cited

U.S. PATENT DOCUMENTS

| | | |
|---|---|---|
| 4,549,173 A | 10/1985 | Nakamura |
| 4,866,542 A | 9/1989 | Shimada et al. |
| 4,887,169 A | 12/1989 | Bannai et al. |
| 4,949,193 A | 8/1990 | Kiesel |
| 5,005,459 A | 4/1991 | Adachi et al. |
| 5,247,126 A | 9/1993 | Okamura et al. |
| 5,265,248 A | 11/1993 | Moulios et al. |
| 5,286,908 A | 2/1994 | Jungleib |
| 5,388,197 A | 2/1995 | Rayner |
| 5,424,848 A | 6/1995 | Son et al. |
| 5,438,423 A | 8/1995 | Lynch et al. |
| 5,521,630 A | 5/1996 | Chen et al. |
| 5,521,841 A | 5/1996 | Arman et al. |
| 5,557,424 A | 9/1996 | Panizza |
| 5,621,538 A | 4/1997 | Gnant et al. |
| 5,692,213 A | 11/1997 | Goldberg et al. |
| 5,701,383 A | 12/1997 | Russo et al. |
| 5,782,692 A * | 7/1998 | Stelovsky ................... 434/309 |
| 5,809,201 A | 9/1998 | Nagasawa |
| 5,867,176 A | 2/1999 | Yamagishi |
| 5,887,110 A | 3/1999 | Sakamoto et al. |
| 5,920,673 A | 7/1999 | Yasukohchi et al. |
| 5,969,716 A | 10/1999 | Davis et al. |
| 5,982,431 A | 11/1999 | Chung |
| 6,005,564 A | 12/1999 | Ahmad et al. |
| 6,098,126 A * | 8/2000 | Batson et al. ............... 709/102 |
| 6,425,825 B1 * | 7/2002 | Sitrick ......................... 463/42 |
| 6,529,685 B2 * | 3/2003 | Ottesen et al. .............. 386/125 |

OTHER PUBLICATIONS

US 5,825,354, 10/1998, Ahmad et al. (withdrawn)
Inventor: Joe O'Connell, Title: Timelapse Tool, Date: 1997. URL: http://www.flashbackimaging.com/image_explorer.htm, Company: Flashback Imaging, Product: Image Explorer.

(List continued on next page.)

*Primary Examiner*—Thai Tran
*Assistant Examiner*—Christopher Onuaku

(57) ABSTRACT

A movie storage, traversal, annotation, and viewing method and apparatus comprised of a graphic output device {such as a monitor} (36), random-access storage media {such as semiconductor memory, a hard disk, or combination} (16), and computation device (14) connecting them. Temporal progression through a movie frame sequence {which may have different temporal frame densities at different regions of the sequence} (200) is determined at view time through: Direct manipulation of user-controlled physical actuators {such as dial(s) (32) with attached rotary encoder(s) (30)}, mathematical functions of time, algorithmically-processed music {102}, or in response to environmental stimuli {such as temperature, light level, and other similar parameters}.

29 Claims, 9 Drawing Sheets

OTHER PUBLICATIONS

URL: http://museumtechnology.com/framed_pages/framed_prod.htm, Company: Museum Technology Source, Product: Video Disc Cruiser Model VC-8.

URL: http://www.futurevideo.com/prod02.htm, Company: Future Video, Product: Media Commander 200.

URL: http://www.quazar.de/uk/produkt/dicom/dicom.htm, Company: Quazar, Product: DicomView and the DicomView jog shuttle.

URL: http://www.replaytv.com/overview/index.htm, http://www.replaytv.com/overview/matrix.htm, Company: Replay TV, Product: Replay TV.

URL: http://www.digital-s.com/thedecks/dec002.html, Company: JVC, Product: BR-D75OU Editing VTR.

URL: http://www.imaja.com/blisspaint/video.html, Company: Imaga, Product: Bliss Paint.

URL: http://documents.cfar.umd.edu/LAMP/Media/Projects/VideoContent/, Company: University of Maryland, Product: Video Content Project.

* cited by examiner

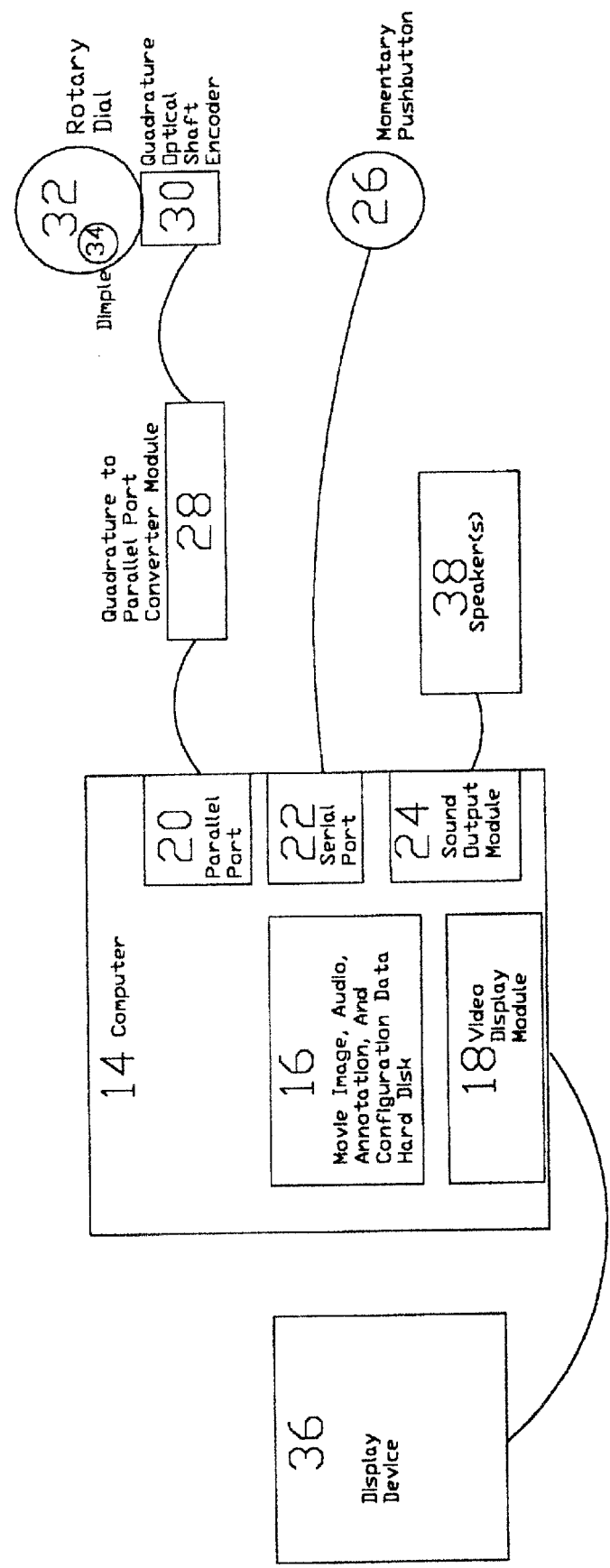
Fig. B1

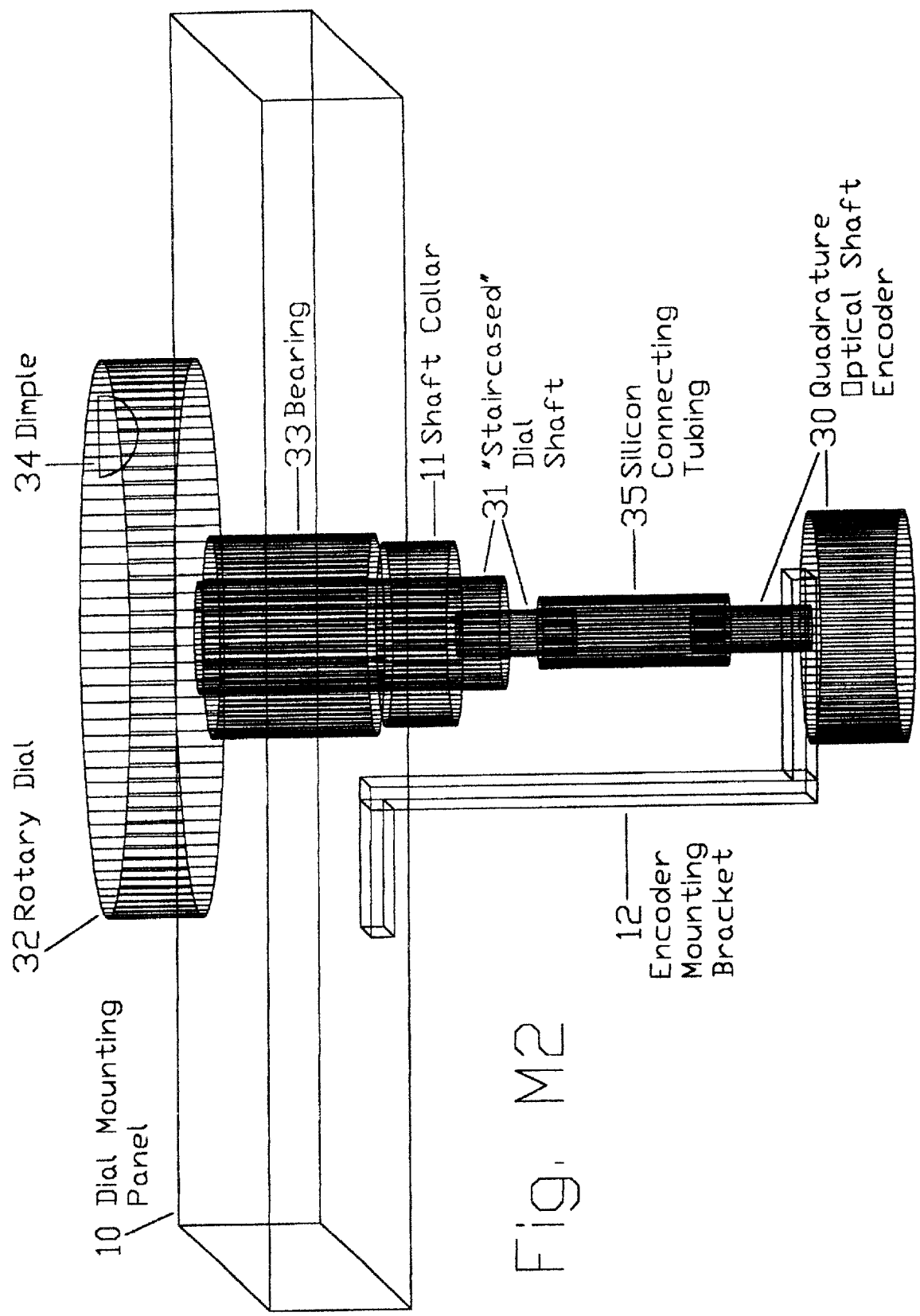
Fig. M2

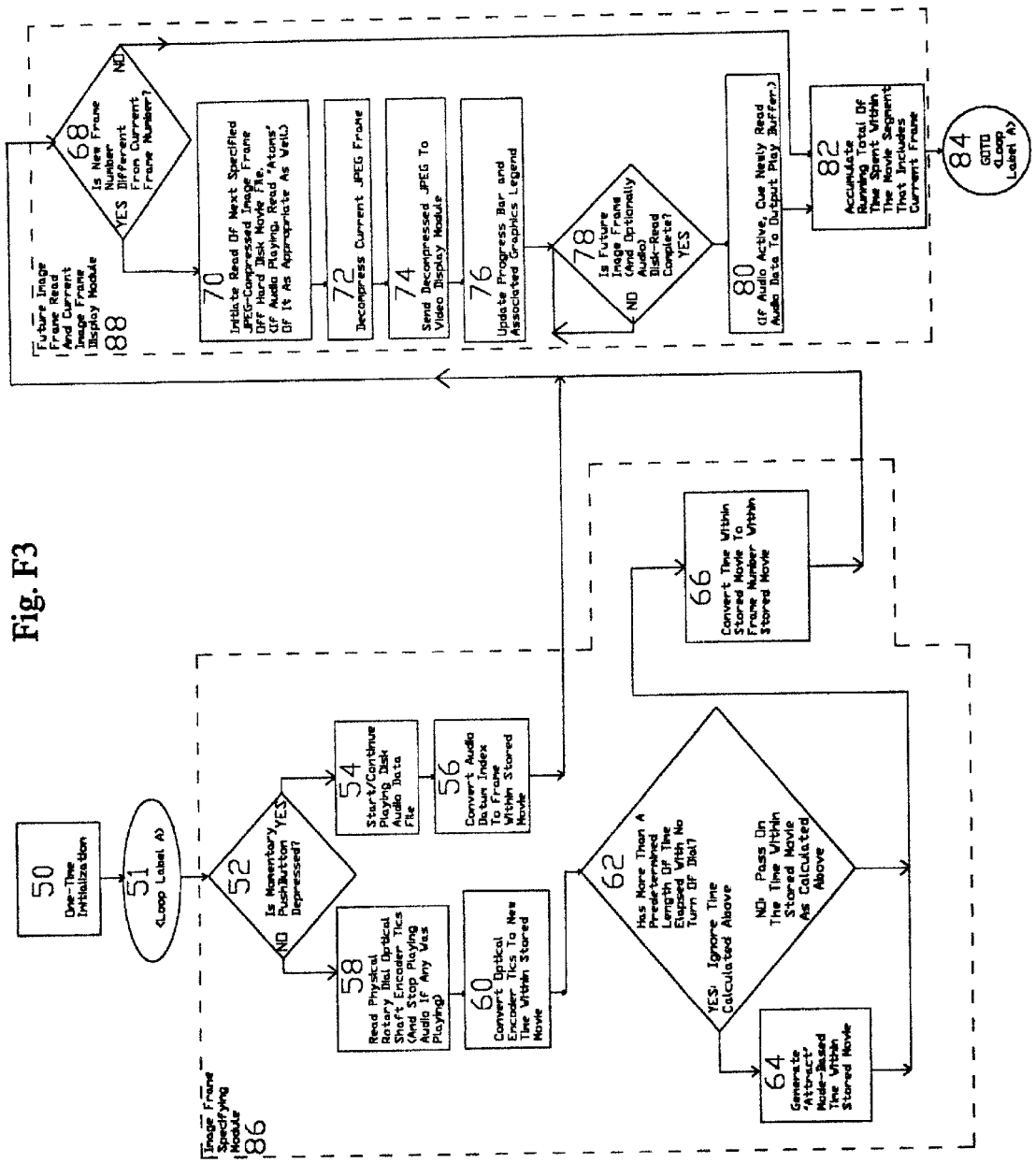
Fig. F3

Fig. S4
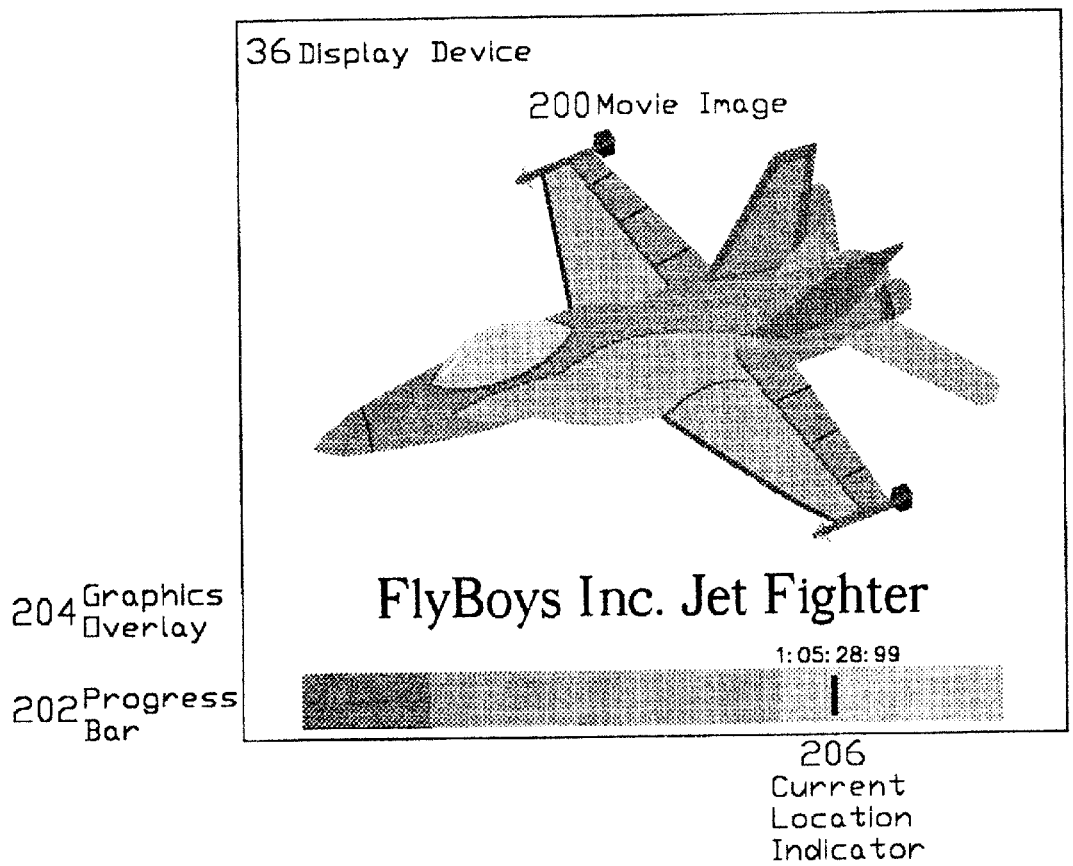

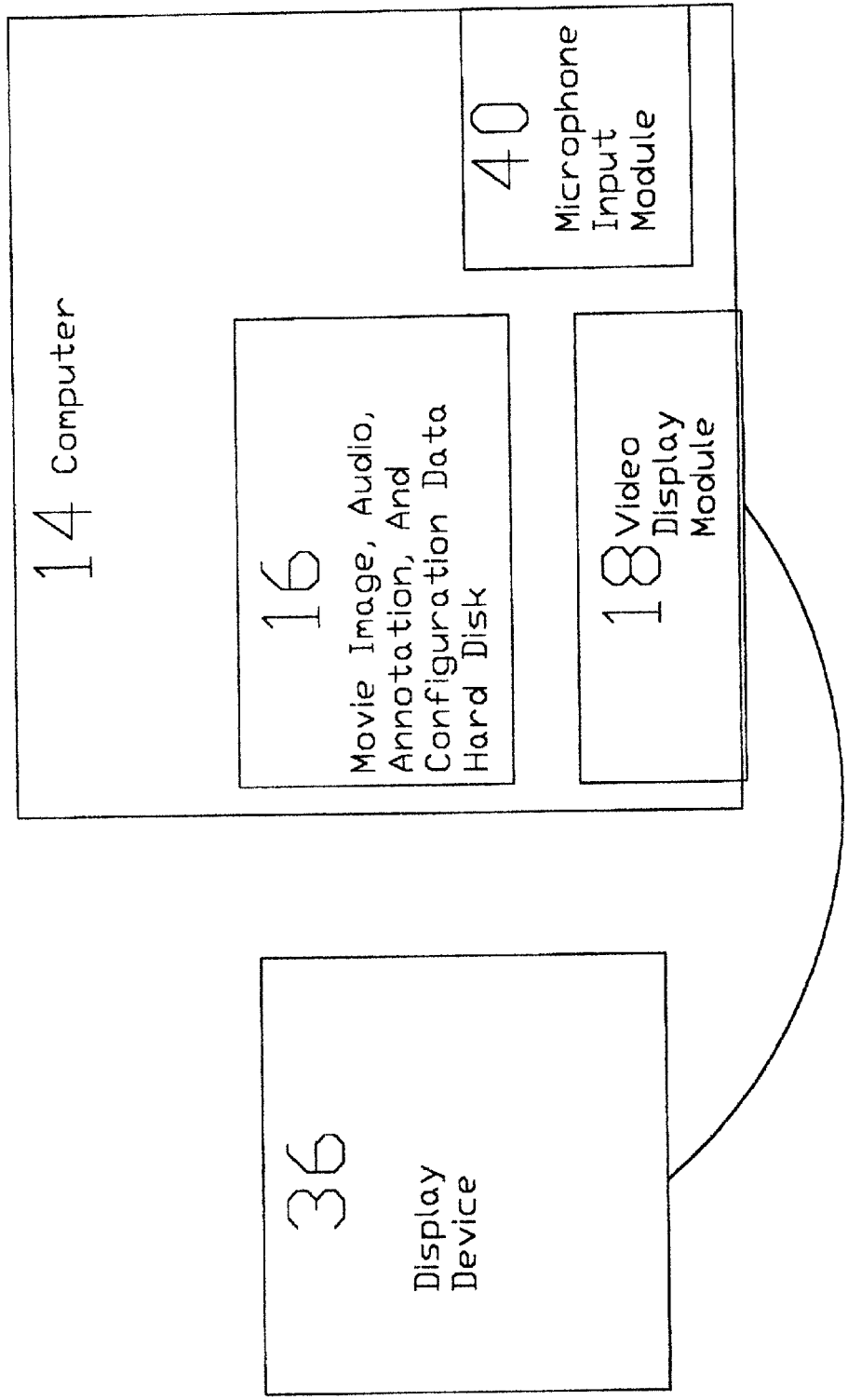
Fig. B5 (Note that references To Audio and Annotation in element 16 should be ignored in this Fig. B5. These references were left in order to remove any ambiguity in element content/numbering across Figs B1 and B5.)

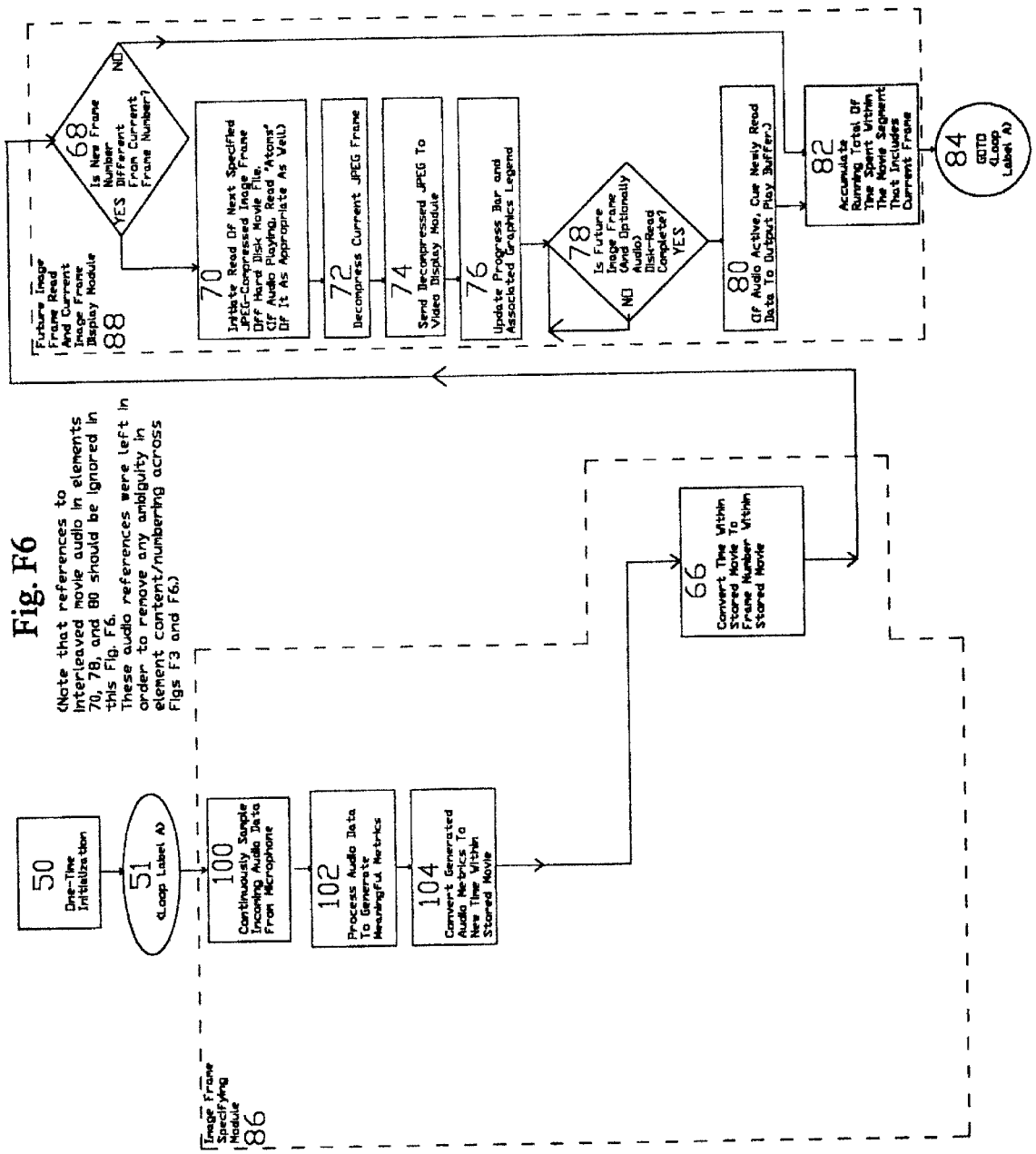

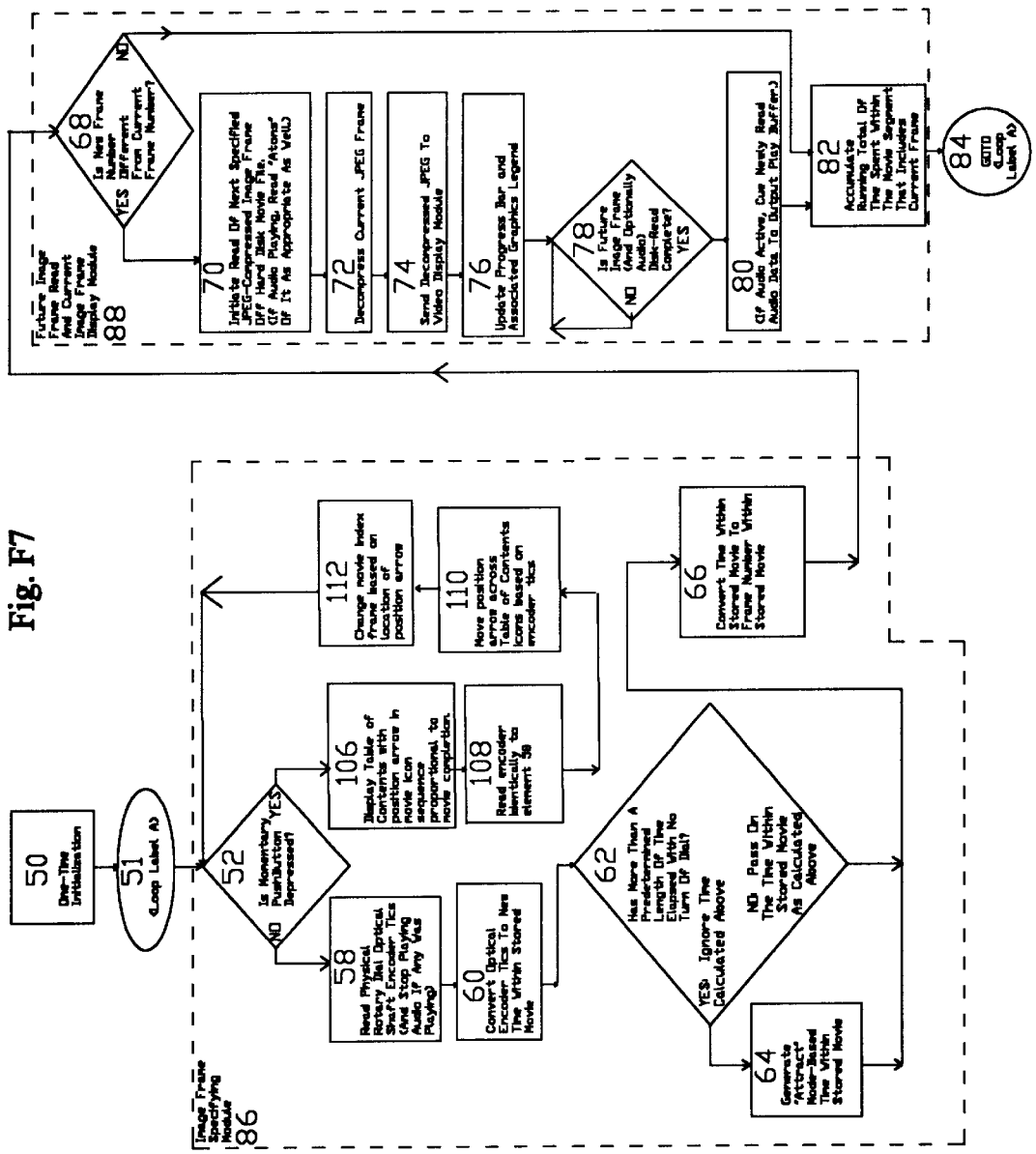

Fig. S8

Table of Contents

Driving

Racing

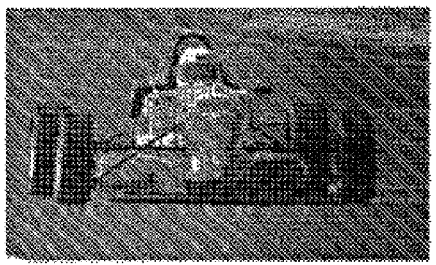

114

Building a Car

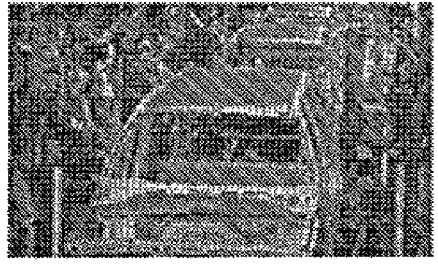

Historical

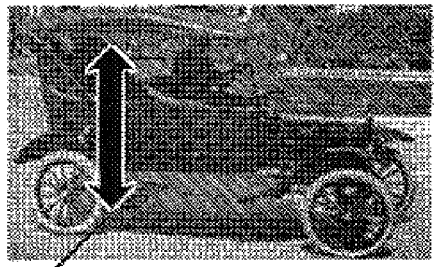

116

- Press the *Table of Contents* button to switch between Normal and Clip Select modes.
- In Normal mode, spin the knob to control the video: forward, reverse, high speed, & slow motion. Hold the *Play* button to play the video at normal speed. Some clips have sound at normal speed.
- In Clip Select mode, spin the knob to choose the video clip.

Copyright (c) 1999. Patent pending by TechnoFrolics.

Fig. G9
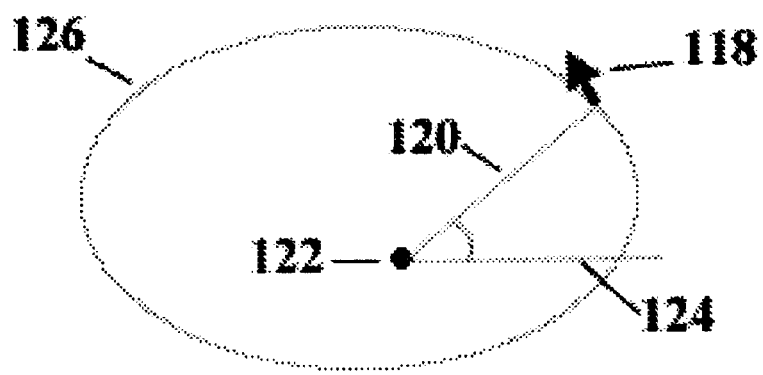

DISPLAY SYSTEM ENABLING DYNAMIC SPECIFICATION OF A MOVIE'S TEMPORAL EVOLUTION

CROSS-REFERENCE TO RELATED APPLICATIONS

This application is entitled to the benefit of Provisional Patent Application Ser. No. 60/114,518 filed Jan. 2, 1999.

BACKGROUND

1. Field of Invention

The present invention relates to movie display systems, and more specifically, to interactive implementations that provide for dynamic selection of displayed movie segments and control of the temporal presentation rate of these segments.

2. Discussion of Prior Art

"Motion Picture" or video imagery in the form of a sequence of still frame images presented in rapid succession—a "movie"—is a commonly understood effective and powerful method of conveying dynamically changing images to humans.

Movies are today used in some manner in virtually all industry and consumer contexts. Applications for movies include entertainment, advertising, group presentation, education, assembly and repair, art, scientific visualization, accident scene re-enactment, and many others.

Note that by "movie", we refer to the presentation of images sequences slightly differing in appearance such that the appearance of motion (or time evolution of another parameter, such as scene lighting, if object position is not the time-evolving element) is perceived by viewers. We do not require that a "movie" be of particular length, stored on a particular media, have a particular frame rate, etc. Thus we include in the content realm TV shows, advertisements, computer-generated scientific visualizations, etc., as well as full length feature Hollywood films. For storage media we include videotape, film, Compact Disk (CD), Digital Video Disk (DVD), computer hard disk, etc. Further, we use the word "movie" to include image sequences or image and audio sequences combined.

In consequence of movies' effectiveness in many applications, not only is the use of movies accepted and widespread, but movies are already available containing images on virtually any subject one could imagine. Such movie images come both from the physical world and from computer graphics. Furthermore, inventions such as consumer camcorders, and to a somewhat lesser extent general-purpose computer animation packages, make creating new movie image content a relatively inexpensive and straightforward matter even for the individual consumer.

While movies are a powerful communications medium, in their common viewing modes they suffer from a number of disadvantages that manifest themselves in many important presentation contexts. These include:

1) Requirement of Audience Attention for Significant Time Periods: For effective presentation, movies typically require audience attention over an extended period of time. In locations such as trade shows, science museums, retail environments, and other similarly time-limited viewing contexts, this can be a significant problem.

2) Lack of Novelty: Because of the proliferation of movies throughout all aspects of our society via TV and other media, movies as a presentation medium lacks novelty for many viewers. In order for movie-based displays to get viewers' attention, therefore, they can require outstanding, and thus typically very expensive, image content and organization production work in the form of filming and editing, computer graphics, or both.

3) Difficulty to Quickly Locate Information of Interest: In environments in which losing the attention of the audience is not the main problem (such as research and video editing environments), it is nevertheless the case that on movie segments, particularly lengthy ones, there can be significant difficult finding particular information in a timely and efficient manner.

4) Lack of Ability to Adequately Dynamically Alter the Rate and Manner of Movie Presentation:

["Manner" is included in the phrase "rate and manner of movie presentation" to convey is the idea that the frame progression may be a complex highly non-linear function of time. For example, consider a film of a person walking across the floor of a room at a uniform rate. Imagine then that the time advance of the resulting movie followed the equation:

FrameNumber=$A+B\sin(Ct)$ where "A", "B" and "C" are appropriately chosen constants and "t" is the actual (viewer-perceived) time. In such an instance (assuming uniform temporal frame spacing), the person would seem to be walking backwards and forwards, pausing at each end of the room.]

&&&& In instances where time compression, dilation, or mathematical functional modification of the presentation rate of movie content is entertaining, useful in apprehending and understanding the movie content, or educational as regards comprehending the flow of time, available viewing environments lack one or more desirable features. Such desirable features include:

a) The ability to view clear, smooth non-distorted images all the way from single-frame stills, to motion sequences running potentially arbitrarily (tens, hundreds, thousands, etc. times) faster (in the plus or minus sense) than their standard presentation rate. Note that by "smooth", what is meant is the lack of a (typically) brief but nevertheless intrusive freezing of the desired time progression of viewed movie image frames, due to (computer) disk access, data transfer, frame decompression time, or other such reasons.

Note that while rate-altered capture schemes and non-real-time movie regeneration methods have important uses, they do not substitute for dynamic alteration of the movie's presentation rate interactively at view time by user manipulated controls, user choice of mathematical function, music, environmental parameters (such as light-level, etc.), or other view-time-dependent input.

b) The ability to alter the frame index, frame rate, or more complex mathematical function determining frame progression, conveniently and naturally—ideally interactively—as the movie is being viewed. Input specifications for time-evolution may include:

i) Rotary dials attached to (optical or other) shaft encoders whose position determines the absolute time within the movie, the rate of time progression through the movie, or other more complex viewed-frame specification methods. Such dials could optionally include a detent that engages the standard 24–30 fps playback rate, optionally with audio.

ii) Algorithms that take music signals as inputs and generate time flows as outputs, in order to enable movie imagery to automatically "dance" to music.

iii) Pressure-sensing "drum" pads, foot-pedals, or the like, that in conjunction with (software) algorithms generate time flows as output, whereby performers may "play" movies (of images such as, for example, the rising of the sun) like a visual analog of a musical instrument.

iv) Other electro/optical-mechanical user actuator, environmental sensor, or algorithmic mechanisms and methods.

c) A modest system cost, ruggedness, and high level of user-friendliness.

Attempts have been made to build movie presentation devices that address one or more of these limitations. These include:

1) "Multimedia" Systems: (Such systems attempt to address the issues of *Requirement of Audience Attention for Significant Time Periods* and *Difficulty to Quickly Locate Information of Interest*.): In such environments movie information is typically stored in a "tree" structured fashion on a random access media such as a Compact Disk Read Only Memory (CD ROM). While helping to reduce the time for a viewer to locate a movie segment-start, this solution has a number of significant disadvantages. These include one or more of:
   a) Expensive production costs to design and implement such a tree-structured software environment for each presentation having new movie image content.
   b) Necessity of knowing a-priori the movie indexing parameters of interest to final viewers. (Attempts have been made to create computer-automated indexing schemes. However these solutions have the drawback that they are typically extremely complex and expensive to implement, and each new indexing parameter typically requires a new indexing algorithm to be developed.)
   c) Reliance on common navigation mechanisms (computer mice, touch screens, etc.) used in conventional ways (such as dragging a slider along a short linear bar) that are neither particularly suited to the application in question nor engaging for the average viewer.
   d) Inability to easily and naturally control the advance through movie image sequences over wide ranges of rates in a manner determined dynamically by the user through one or more of rotary dials, mathematical algorithms, environmental parameters, music, or other input signal or mechanical control.
   e) Inability to present visually clear images and temporally smooth frame transitions at all viewing rates over the entire length of the movie.
   f) Highly specialized graphical user interfaces ill suited for frequently updating the display inexpensively with new movies showing widely differing content.

2) Very Large Movie Images, 3-D Movie Images Requiring Special Glasses, Moving Movie-Theater Seats, Etc.: (Such schemes attempt to address the issue of *Lack of Novelty*.): These and other similar prior specialty movie making, projecting, and viewing methods have a number of significant drawbacks including one or more of:
   a) High cost to produce.
   b) Projection mechanism complex, expensive, and hard to transport.
   c) Inappropriate for space-limited presentation applications.
   d) Lack of audience interactivity.
   e) Inability to easily and naturally control the advance through movie image sequences, over wide ranges of rates and in a manner determined dynamically by the user through one or more of rotary dials, mathematical algorithms, environmental parameters, music, or other input signals or mechanical controls.

3) DVD Movie Players, Conventional General Purpose Computer (i.e., PC, MAC, or the equivalent)-based Multimedia Movie Players such as Apple Corporation's Quicktime Software, and Conventional Video Tape Players: (Such systems make efforts to address the issues of *Difficulty to Quickly Locate Information of Interest* and *Lack of Ability to Adequately Dynamically Alter the Rate and Manner of Movie Presentation*.): These systems have a number of significant drawbacks including one or more of:
   a) Very limited control of the rate and manner of time evolution of the viewed movie.
      i) Typically "fast-forward/reverse" rates are very limited compared to the present movie display invention. Attempting to exceed these very limited rates offered by existing systems (if possible within fast-forward/reverse modes, or if not, by dragging an on-screen slider, multiply pressing a button an a remote control unit, etc.) typically results in visual frame degradation, temporal inter-frame "glitching", or both.
      ii) User interfaces ill-suited for delicate and flexible interactive control of a movies time evolution.
      iii) Inability to control the time evolution of movie frame presentation in any sophisticated manner (such as, for example, from beat information extracted from algorithmically-processed music).
   b) Ill-designed for presentation and public installation purposes: Problems typically include one or more of:
      i) Undesirable visual screen clutter (e.g., icons, menus, etc.).
      ii) Lack of desired controls and features (e.g., a table-of-contents button).
      iii) Inability to remove controls that allow the public inappropriate access to the system (e.g., the ability to exit the program, delete a movie, etc.)
      iv) Inadequately rugged.

4) Semiconductor Random-Access-Memory (RAM) based perusal systems. (Such systems, in certain select instances, make efforts to address the issues of *Difficulty to Quickly Locate Information of Interest, Lack of Ability to Adequately Dynamically Alter the Rate and Manner of Movie Presentation*, and *Lack of Novelty*.): These systems suffer from the severe drawback that to view clear, smooth images in the desired temporal glitch-free manner, movie content must fit entirely in RAM. Even using image compression, this so limits the amount of movie content as to preclude use in many important applications.

SUMMARY

In accordance with the present movie display invention, a system for entertainment, advertising, group presentation, education, assembly and repair, art, scientific visualization, accident scene re-enactment, research, direction-providing, video-editing assistance, gaming, and animation comprised of:

storing movie imagery in a substantially random access media;

connecting to this substantially random access media an image output device for the movie imagery;

providing a means for transferring spontaneously-chosen arbitrary sequences of movie frames from the mass storage device to the display medium while preserving image quality and temporal fluidity;

providing a means for users at view time to dynamically control the progression through stored movie imagery, and thus control the effective flow of time, via one or more of: rotary dials, music analysis algorithms, mathematical functions, or other mechanical, environmental stimuli, or algorithmic means.

OBJECTS AND ADVANTAGES

Accordingly, several objects and advantages of the present movie display invention are:

1) To provide a method and apparatus for convenient control of frame advance within a movie, at view time, through one or more of rotary dials, music analysis algorithms, mathematical functions, or other user-controlled, environmental stimuli, or algorithmic methods.

[Note that in the case of rotary dial use, more than one rotary dial may be used, where each dial has a different frame-traverse sensitivity, in order that time scales from pico-seconds to millennia may be comfortably traversed. Similarly, some dials may control the position in the frame sequence, others the rate of progression through the frame sequence, and yet others implementing more complex frame advance algorithms. Such algorithms could include frame advance sensitivity that is itself a complex function of dial position, rotation rate, acceleration, etc. Furthermore, such dials could optionally include a detent that engages the standard 24–30 fps playback rate, optionally with audio.]

2) To provide a method and apparatus for viewing, clearly and smoothly, movies presented at highly variable rates of progression (still-frame to potentially tens, hundreds, thousands, etc. times faster than normal viewing rates) over the entire length of the movie. (In most circumstances audio would be disabled or reduced in volume during high-speed traverse, but may be included if desired.)

3) To provide a method and apparatus for implementing interactive movie-based signs that are dynamic, highly flexible in appearance, and eye-catching.

4) To provide a high movie-viewing novelty factor for entertaining and attracting diverse audiences to already existing or newly created movies for the purposes of entertainment, advertising, education, and other applications benefiting from an ability to attract audiences.

5) To provide a mechanism for existing (and specially created) movie sequences to dance to music.

6) To provide an effective way of presenting movie information to audiences having limited available viewing time or short attention spans.

7) To provide an effective way for researchers, tourists, students, repair personnel, and others to locate, review, and peruse information of interest within movie segments.

8) To provide an effective method and apparatus for apprehending and understanding movie contents, particularly as such contents relate to time-evolving processes. Such contents could include movie images of chaotic and non-chaotic physical processes (vibrations, phase transitions, many-particle equilibrium states, crystal formation, biological growth, etc.), sporting events, trips from one location to another for the purpose of providing directions, traffic patterns, weather, dance performances, automated manufacture of consumer goods, graphic evolving artworks, and many other possibilities too extensive to exhaustively enumerate.

9) To provide a way to educate viewers generally as regards comprehending the flow of time.

10) To provide a tool by which existing movie compositions may be conveniently explored in order to better understand movie producers' stylistic and editing choices from an artistic perspective.

11) To provide a method and apparatus by which it can be made to appear, through a shared functional dependence on time, that users have control of a physical process or action occurring within a movie scene.

For example, consider first filming a room being lit progressively more brightly as the result of someone turning a dimmer at a temporally uniform rate. Then, when such a movie is presented with (for example) a rotary dial frame-advance control, it will appear to the user that they are controlling the light dimmer mechanism itself A similar effect would result if one were to present a gear train, factory automation mechanism, or the like, filmed moving at a uniform rate. Indeed, by choosing the effective time-flow (i.e., frame-advance) sensitivity of the physical rotary dial appropriately, one could make the physical dial turn at exactly the same rate as a corresponding visual element in the movie scene, thus increasing the strength of this "illusion" even further.

And finally, by making a physical actuator appear to be a continuation of an element in the movie scene, such an illusion is enhanced even further.

Many other applications of this general principle exist that are too extensive to enumerate.

Note that a key feature of this system, distinguishing it strongly from video games, virtual reality systems, computer simulations, and the like, is that the described user experience of scene control in each specific instance may be achieved with virtually no custom programming.

12) To provide a method and apparatus with the above desirable features where in addition:

a) Movie frame sequences of differing temporal densities may be conveniently saved without significant waste of storage media space.

In this way, processes occurring on times scales all the way from pico-seconds to millennia may be easily stored and traversed. Whereby audience may explore processes ranging from such events as atomic electron orbit energy transitions to continental drift, from nerve impulses travelling along a sprinter's legs to the lifetime aging of the sprinter. (For reasons of both practicality and real-world physical limitations, movies portraying such tiny or huge time scales would typically be created by computer graphic means.)

b) Each movie frame may be individually compressed in order to save storage media space.

c) Movie images are free from overly numerous menu buttons or other undesirable images.

d) Text and graphic annotation and progress bar image(s) appear at view time as determined by the location currently being viewed in the movie. (The progress bar may include a numeric as well as graphic timewithin-movie indicator. It may also include a sliding alphabetized list of movie segment names.)

e) The display, after a predetermined period of no user activity, enters an "attract" mode, such that users are drawn to the display when it is unattended. This attract mode optionally includes such features as:
   i) Moving from one stored movie segment to another, in order that each of the stored movies is guaranteed to be seen by audiences. Such transitions could occur via sophisticated temporal paths that result in movie scene evolutions that are both complex and alluring.
   ii) If a dial actuator is used:
      (1) Having the physical dial turned by means of a small motor. (The movie could advance in response to such turning or not as is desired.)
      (2) Having a tiny movie image of the physical display itself, where the tiny dial turns as the associated tiny movie advances.
   iii) Having musical songs play intermittently, where the movies' effective advance time is controlled by algorithms applied to these songs, in order to have the movie imagery appear to "dance" to the song.

f) There exists a simple user interface such that the display can be used by typical members of the public with no prior training.

g) Conventional movies may be converted the required display format simply and quickly.

h) The display is rugged, user-friendly, and of modest system cost.

i) The user may, by pressing a momentary pushbutton or other similar activation means, initiate a movie image sequence to play forward at a predetermined rate (which could be 0, the normal 30 frame/sec rate, or some other appropriate predetermined rate) along with associated audio.
   Such an automated visual and audio playback sequence may start at the current frame being viewed, or may automatically be reset to begin at the start of some predetermined section—typically the section from which the currently viewed frame originates.
   The accompanying audio may be tightly time-synchronized to the images being viewed, as would typically be the case when the audio is intrinsically connected to the displaying images—for example, a movie showing a singer in performance. Alternatively, the audio may be a narrative unconnected with the intrinsic time evolution of the event—for example, a narrative accompanying images of the blooming of a rose.

j) Advertisers, educators, and others may track the fraction of time that a given movie segment is chosen for viewing by audiences. In this way, advertisers may be billed an amount proportionate to their product's or service's exposure, educators may learn which presented subject areas are particularly interesting to, or particularly difficult for, various audiences, etc.

k) Movie frame advance will pause for a predetermined amount of time at a movie boundary, in order that high-speed (typically dial-actuated) traversals do not "fly past" short movie segments.

l) Users may, by pressing a momentary pushbutton or other similar activation control, cause the above-described display to move to a particular frame within its stored sequence.

m) Users depressing a "Table-of-Contents" button will cause:
   i) Display on the viewing screen of a table of contents consisting of names and/or descriptions of the stored movies.
   ii) An indicator—for example an arrow—to be present showing where in this movie list the current movie frame display pointer lies (that is, where the user's viewing position is within the stored movie(s)).
   iii) Turns of the movie control dial, or other such control mechanism, to move this arrow through the table of contents list. The effect of this is such that when the Table-of-Contents button is released, the movie frame display pointer (and thus the user's position within the stored movie (s)) will be changed to display the new location within (a potentially different) movie segment as determined by the table of contents arrow.

Still further objects and advantages will become apparent from consideration of the ensuing description and drawings.

DESCRIPTION OF DRAWINGS

Block diagram figures are prefixed by "B", software flowchart figures are prefixed by "F", general diagrams are prefixed by "G", screenshot figures are prefixed by "S", and mechanical figures are prefixed by "M".

Drawing Figures

FIG. B1 shows a block diagram of a typical embodiment of the present movie display invention with dial and momentary pushbutton controls.

FIG. M2 shows a drawing of a suitable mechanical assembly for connecting a rotary dial to a quadrature optical shaft encoder.

FIG. F3 shows a flowchart of a typical dial and momentary pushbutton-controlled embodiment.

FIG. S4 shows a screenshot of a typical dial and momentary pushbutton-controlled embodiment.

FIG. B5 shows a block diagram of a typical embodiment of the present movie display invention with microphone input.

FIG. F6 shows a flowchart of a typical microphone-input music controlled embodiment.

FIG. F7 shows a flowchart of a typical embodiment of the present movie display invention.

FIG. S8 shows an example table of contents for the present movie display invention.

FIG. G9 shows a diagram of the polar coordinate mouse motion tracking.

REFERENCE NUMERALS IN DRAWING

From Block Diagrams

14 Computer.
16 Movie Image, Audio, Annotation, And Configuration Data Hard Disk.
18 Video Display Module.
20 Parallel Port.
22 Serial Port.
24 Sound Output Module.
26 Momentary Pushbutton.
28 Quadrature To Parallel Port Converter Module.
30 Quadrature Optical Shaft Encoder.
32 Rotary Dial.
34 Dimple.
36 Display Device.

38 Speakers.
40 Microphone Input Module.

From Software Flowcharts

50 One-Time Initialization.
51 <Loop Label A>.
52 Is Momentary Pushbutton Depressed?
54 Start/Continue Playing Disk Audio Data File.
56 Convert Audio Datum Index To Frame Within Stored Movie.
58 Read Physical Rotary Dial Optical Shaft Encoder Tics (And Stop Playing Audio If Any Was Playing).
60 Convert Optical Encoder Tics To New Time Within Stored Movie.
62 Has More Than A Predetermined Length Of Time Elapsed With No Turn Of Dial?
64 Generate "Attract" Mode-Based Time Within Stored Movie.
66 Convert Time Within Stored Movie To Frame Number Within Stored Movie.
68 Is New Frame Number Different From Current Frame Number?
70 Initiate Read Of Next Specified JPEG-Compressed Image Frame Off Hard Disk
Movie File. (If Audio Playing, Read "Atoms" Of It As Appropriate As Well.)
72 Decompress Current JPEG Frame.
74 Send Decompressed JPEG To Video Display Module.
76 Update Progress Bar and Associated Graphic Legend.
78 Is Future Image Frame (And Optionally Audio) Disk-Read Complete?
80 (If Audio Active, Cue Newly Read Audio Data To Output Play Buffer.)
82 Accumulate Running Total Of Time Spent Within The Movie Segment That Includes Current Frame.
84 GOTO<Loop Label A>.
86 Image Frame Specifying Module.
88 Future Image Frame Read And Current Image Frame Display Module.
100 Continuously Sample Incoming Audio Data From Microphone.
102 Process Audio Data To Generate Meaningful Metrics.
104 Convert Generated Audio Metrics To New Time Within Stored Movie.
106 Display Table of Contents with position arrow in movie icon sequence proportional to movie completion
108 Read encoder identically to element 58
110 Move position arrow across Table of Contents icons based on encoder tics
112 Change movie index frame based on location of position arrow From Screen Shots 114 Table of Contents Icons
116 Current Position Arrow
200 Movie Image.
202 Progress Bar.
204 Graphics Overlay.
206 Current Location Indicator.

From Mechanical Drawings

10 Dial Mounting Panel.
11 Shaft Collar.
12 Encoder Mounting Bracket.
31 "Staircased" Dial Shaft.
33 Bearing.
35 Silicon Connecting Tubing.

From General Figures

118 Mouse Cursor.
120 Line Between Reference Center Point and Current Mouse Cursor Position.
122 Reference Center Point.
124 Horizontal Reference Line.
126 Path Described by User Movement of the Mouse.

SPECIFICATIONS

Clarification of General Specification Terms

1. When we use the term "animation", we refer to using the present movie display invention to create new animations, where the manner of time traversal of a prior video sequence or prior animation is the new element of importance. For example if an animated sequence had been previously created in which a character "walked" at a uniform rate across the screen, the present movie display invention could be used to quickly and easily create a new animation in which the character performed back-and-forth skipping motions, pauses, and sprints.

2. When we use the phrase ". . . engagingly alter the rate and manner of travel". By adding the word "manner" to "the rate of travel", what we mean to convey is the idea that the frame progression may be a complex highly non-linear function of time. For example, consider a film of a person walking across the floor of a room at a uniform rate. Imagine then that the time advance of the resulting movie followed the equation:
FrameNumber=A+Bsin(Ct) where "A", "B" and "C" are constants and "t" is the actual (viewer-perceived) time. In such an instance (assuming uniform temporal frame spacing), the person would seem to be walking backwards and forwards, pausing at each end of the room.

Description of Invention—FIGS. B1, B5, M2

Clarification of Description Terms

1. The Summary and Claims section of this patent application use the phrase "substantially random access" when referring to the type of movie storage media, while all other areas use the simpler more commonly accepted industry phrase "random access". We intend both phrases to mean the same thing.
When we use the simpler phrase "random access", it is because we wish readers skilled in the art of computer hardware to readily understand our language, and in order to be able to contrast the phrase "random access" with "sequential access" in their normal usage. When we choose to use the phrase "substantially random access", it is because we want to be technically more accurate than common usage allows.
Specifically, the commonly accepted distinction between random access and sequential access media, is that:
In random access media, it is possible to read a desired piece of information from the physical storage media "very quickly", no matter where on the storage media the data physically lies, and without have to pass over all other stored data.

Whereas in sequential access media, the time to retrieve a piece of data is highly dependent upon where the currently desired data lies as compared to the last data read, and all intervening data must be passed over.

A typical example of a random access mass storage media is a hard disk drive, whereas a typical example of a sequential access mass storage media is a videotape.

However, even on a common hard disk drive, it is the case that the time required to access a new desired piece of data is dependent upon where the last datum was located, and some intervening data must be passed over even with this hardware. What is guaranteed for a hard disk drive, however, is that the maximum time required to access the new desired data in all situations is "very short", typically less than 20 milliseconds in worst case conditions as of the writing of this patent application. This contrasts strongly with videotape, where it may take as long as 10 minutes to read data located at the opposite end of the tape from the last datum read. Nevertheless, we would like to reiterate that both "random" and "sequential" access storage media typically exhibit data read times dependent on the position of the desired data as compared with the last data read.

In summary, what we mean by "substantially random access" is that arbitrarily selected data may be read "very quickly", no matter where on the storage media the data physically lies, just as those skilled in the art of computer hardware typically mean by the phrase "random access".

Dial Controlled Model Preferred Physical Embodiment Block Diagram FIG. B1 and Mechanical Drawing FIG. M2

FIG. B1

FIG. B1 show a block diagram of a typical rotary dial 32 controlled physical embodiment of the present movie display invention with rotary dial dimple 34 and audio-activation and normal-movie-play-rate momentary pushbutton 26.

Computer 14 contains hard disk random access mass storage media 16, video display module 18, parallel port 20, serial port 22, and sound output module 24. A typical off-the-shelf mid to high end home or office computer system running Windows® NT from any of a number of well-known vendors including IBM, Compaq, Dell, and others would function adequately to provide these elements 14, 16, 18, 20, 22 and 24. An example of such an appropriate system is a Compaq Deskpro EN Model #6450CD with Intel Corp. Pentium® II/450 MHz processor, 6.4 Gig Hard Drive, 64 MB RAM, 4 MB AGP Videocard, Integrated Audio, and Windows® NT, as sold by PC Connection, Marlow N.H.

Connected to the computer's 14 parallel port 20 is a quadrature-to-parallel-port converter module 28, quadrature optical shaft encoder 30, and rotary dial 32 with dimple 34, mechanically connected to the shaft encoder 30.

An appropriate shaft encoder 30 and quadrature-to-parallel-port converter 28 may both be purchased from US Digital Corp., Vancouver, Wash. An appropriate shaft encoder 30 would typically have a minimum of 256 detectable tics per revolution in order to have users experience a feeling of very fine control of movie advance, but lower resolutions are allowable.

An appropriate rotary dial 32 may be purchased from many sources including S&W Manufacturing Co., Bensenville, Ill. Their 3" diameter stainless steel dial, machined to add dimple 34, is suitable. A rotary dial 32 with a moment of inertia similar to S&W's model mounted on a low friction bearing is particularly appropriate due to its resulting effect of smoothing what might otherwise be undesirable visual "jerks" in the rate of movie advance. Such a feature, while in many applications desirable, is not a requirement. The purpose of dimple 34 is to provide convenience and a movie advance-rate smoothing effect for users wishing to rotate the dial many revolutions at a high rate of speed; its presence is optional.

Any rugged momentary pushbutton 26, such as are designed for arcade games, is suitable. A number of pins on the serial port 22 may be used to read the state of the pushbutton without required a serial adapter module. For example, by connecting one terminal of the pushbutton 26 to the Carrier Detect (CD) pin of the serial port 22 and the other terminal to the Data Terminal Ready (DTR) pin of the serial port 22, and then toggling the DTR pin and seeing if the CD pin toggles as well, readily enables the computer to read the state of the button.

The display device 36 connected to video display module 18 may be a common TV, computer monitor, plasma display, video projector, videowall, or the like, all made by any number of manufactures both in the US and abroad.

The speakers 38 connected to sound output module 24 may be any speakers as would commonly be included with such a computer system as 14.

FIG. M2

FIG. M2 shows a drawing of a suitable mechanical assembly for connecting rotary dial 32 to quadrature optical shaft encoder 30. Rotary dial 32 is attached to a radially "staircased" dial shaft 31. Staircased dial shaft 31 passes through bearing 33 which is in turn affixed to dial mounting panel 10. Shaft collar 11 secures shaft 31. Encoder mounting bracket 12 is attached to mounting panel 10 and supports encoder 30. Silicon connecting tubing 35 provides a shock isolating and alignment-forgiving rotary connection between dial shaft 31 and encoder 30.

Music Controlled Model Preferred Physical Embodiment Block Diagram FIG. B5

FIG. B5

FIG. B5 show a block diagram of a typical music-activated physical embodiment of the present movie display invention with microphone input module 40. (A suitable microphone input is included as part of most current computer systems—a specific instance of which has already been listed above.)

Operation of Invention—FIGS. F3, S4, F6

Clarification of Operation Terms

1. Data files ending in ".WAV" indicate they are of the standard PC audio wave format. Data files ending in ".BMP" indicate they are of the standard PC 24-bit color bmp bitmap image format.

Data files ending in ".JPG" indicate they are of the standard PC jpeg compressed image format.

Dial-Controlled Model Preferred Embodiment Operation

Overview

During operation, the particular embodiment described in block diagram FIG. B1, flowchart FIG. F3, and screenshot FIG. S4 functions in the following manner:

1) When the momentary pushbutton 26 is not depressed, movie 200 will advance based upon the turning of the rotary dial 32, without accompanying audio.

a) When dial 32 is stationary, a single clear still movie 200 frame will be visible. Turning dial 32 will cause movie 200 to play at a rate and direction determined by dial 32's rotation.

When dial 32 is turned relatively slowly, movie 200 will advance slowly forwards or backwards (depending upon the direction of dial 32's rotation) frame by frame. Up to approximately the normal viewing speed, advance through movie 200 image frames will be approximately linear; in other words, rotating dial 32 twice as fast will result in stored movie 200 running twice as fast. Above approximately normal speed, once a 180 degree rotation of dial 32 in one direction is detected (this limitation is imposed in order that fast twists back and forth do not engage this non-linear mode), the relationship between dial 32's rotation rate and advance through movie 200 frames becomes highly non-linear. Specifically, above approximately normal speed, increasing dial 32's rotation rate results in an exponential increase in traverse rate through movie 200. In this way, intuitive and sensitive control may be achieved, while at the same time allowing the user to traverse hours of movie 200 imagery in just a few seconds.

b) At a specified location on display device 36, typically the bottom of the screen, a static progress bar 202 and current location indicator 206 are visible. Progress bar 202 delineates between various distinct movie 200 segments (such as footage showing a plane flying vs. footage showing a river flowing) by various gray scales or similar visual delineators. Current Location Indicator 206 provides a needle and current time-within-movie numerical value that moves across the progress bar in accordance with the current movie 200 frame being displayed.

c) Graphics overlay 204 provides a method by which static signage may be easily overlaid onto movies 200. Graphic overlay 204 will typically change content as the user passes from one movie segment to another.

d) As the user turning the dial causes imagery to progress from one movie segment to another, typically frame advance will pause for a predetermined amount of time at a movie boundary, in order that high-speed traversals do not "fly past" short movie segments. During this pause, screen 36 will display the current single movie frame, a black screen, a movie table of contents, or other such desirable inter-segment delineator.

2) When the momentary pushbutton 26 is depressed, the movie will advance at a predefined play rate (typically the movie's conventional viewing rate), along with accompanying audio, beginning such play at the movie 200 segment showing at pushbutton 26 press time. During the period when pushbutton 26 is depressed, and thus movie 200 is playing along with accompanying audio, rotations of dial 32 are ignored.

3) If a predetermined period of time (for example two minutes) elapses without either dial 32 being moved or pushbutton 26 being depressed, the display will enter an "attract" mode. This autonomous mode will typically present a sequence of selected segments from stored movies 200. The manner in which such segments are presented would typically include unusual and eye-catching time evolutions that vary in rate and direction in striking and functionally complex ways.

Exiting from this autonomous attract mode will occur immediately upon dial 32 being moved or pushbutton 26 being depressed, at which point movie 200 traversal will return to manual control, beginning at whatever location is currently been displayed.

4) Both in user-control mode and automated attract mode, the display will accumulate how long movie 200 presented imagery lies within ranges defined by a predetermined list of movie segments. In this manner, advertisers and others may know the amount of time their particular movie imagery was displayed.

Software Flowchart FIG. F3

FIG. F3 shows a software flowchart for the physical embodiment portrayed in block diagram FIG. B1 and screenshot FIG. S4.

Located on movie image, audio, annotation, and configuration data hard disk 16 are a number of files, specifically:

1) ACT1.MOV, ACT2.MOV, etc.

A series of industry-standard "Quicktime®" format movie files, typically one for each movie segment, and typically containing audio interleaved with MJPEG/A-compressed video. [Note that "Motion JPEG" (MNPEG) is a very minor modification of industry-standard single frame JPEG. Note also that the specifications for the industry-standard Quicktime® movie format is detailed on Apple Corp. web site at www.apple.com. The MJPEG and JPEG formats are similarly documented at various readily available publicly promoted sources such as in the book "JPEG: Still Image Data Compression Standard, by W. B. Pennebaker and J. L. Mitchell.] Compressors and decompressors for such formats are available from many sources, including within the Quicktime® Version 3.0 code itself.

[Note that conversion of movies stored on videotape to Quicktime® digital format may be performed by any number of commercial products such as the capture board made by Aurora Design (www.auroradsgn.com).]

2) MOVIE.LOG

A master configuration file that specifies the Quicktime® movies and their properties. This file contains:

a) The list of Quicktime® D movie segments.

b) For each movie segment, the default frame rate in pico-seconds as a 16 byte integer.

c) For each movie segment, the action to take upon depression of button 26. For example, whether to play the movie imagery along with accompanying interleaved audio and ignore turning of the dial vs. playing a separate audio file determined by the movie segment, and letting the dial control the viewed imagery. (Note that in the preferred embodiment shown in flowchart FIG. F3, the former is described.)

3) MOVIE.LOG

This file, optional, contains a list of frame ranges and pico-second frame rates such that varying frame rates may be implemented within a single movie segment.

4) INDEPENDENT_AUDIO.AUD

This file, optional, contains the information necessary to play audio independently from viewed video imagery. It contains:

a) A list of WAV audio files.

b) The frame range for each such audio file to play.

c) What system states (button presses, entry into specified frame range, etc.) activate this mode.

d) The maximum play length for each such audio segment.

5) INDEPENDENT_AUDIO1.WAV, INDEPENDENT_AUDIO2.WAV, etc.

Independent audio files referred to above.

6) GRAPHIC_OVERLAYLOG

This file, optional, contains the information necessary to show graphic overlays. It contains:
a) The image bitmap names.
b) The movie frame ranges in which to display these images.
c) The X,Y screen locations to display the lower left-hand corners of these images.

7) LEGEND2.BMP, LEGEND1.BMP, etc.

The bitmap files referred to above.

8) PROGRESS.BAR

The progress bar segment definition file containing a list of start and end frames for each movie segment.

9) ATYRACT.ATT

The attract mode configuration file. This file contains the data necessary to implement the "attract" mode—the mode that is typically entered after a predetermined time with no detected user activity. The file contains the time to delay before entering the attract mode, and the parameters of an algorithm that specifies the effective movie progression during time spent in attract mode. (Many algorithms are suitable and could be readily implemented by one skilled in the art.) TOC.MNU.

The Table-of-Contents configuration file. This file contains the data necessary to implement the table of contents of FIG. S8.

Notes:
1) Windows® NT with DMA enabled is desirable as an operating system in that it permits disk file reads to occur in parallel with Pentium®-based frame decompression computation.
2) Pico-second 16 byte movie frame time stamps are used in order that events of wide time scales ranging from tiny fractions of a second to millennia may be readily traversed.

Initialization module 50 parses the disk files listed above, configuring memory-resident program structures so as to permit substantially instant access to image frames as a function of movie-time, display graphic overlay legends when appropriate, etc. Given the list of disk files above, all of these details are well within the abilities of a person skilled in the relevant arts without undo experimentation.

Image frame specifying module 86 determines the currently selected (M)JPEG-compressed movie image frame to be read in from the hard disk. This read-in image will be visually displayed the following time through infinite loop A. Within image frame specifying module 86 are a variety of subcomponents.

Element 52 examines whether the momentary pushbutton 26 is depressed. If button 26 is not depressed, then the position of the rotary dial 32 is read in by low-level encoder hardware access element 58, and its output value is modified by element 60 to apply various mode and sensitivity settings to provide a time within the stored movie. Element 62 checks whether the calculated time within the movie has remained unchanged for a predetermined length of time (e.g. 2 minutes). If it has, indicating the dial has been stationary for that duration, a new time-within-the-movie is generated by attract mode element 64. (The manner in which this attract-mode time is generated will vary depending on the particular movie content and may be readily implemented by one skilled in the art.) Element 66 converts the dial or attract mode generated time to an image frame location within the hard disk Quicktime® movie file.

If button 26 is depressed, displayed video images are slaved to the playing of the audio interleaved with the video within the Quicktime® movie. This process is straightforward to perform and is done by all industry-standard Quicktime® movie players, including the one that comes with the Quicktime® environment itself.

(Note, as discussed under "Scope" below, that other embodiments may readily be programmed to play an audio track relatively disconnected from the video imagery. In this case, depressing button 26 would cause the playing of an audio-only WAV file while video imagery was controlled by the motion of the dial or other non-audio mechanism.)

The future image frame read and current image frame display module 88 reads off the hard disk into Random Access Memory (RAM), the image frame it will need to display the next time through loop A. It also decompresses and displays the already-read-into-RAM image frame from the previous time through loop A. If audio is playing, it also reads off the hard disk and loads into a play buffer the appropriate audio data. Within read and display module 88 are a variety of subcomponents.

Element 68 determines whether the next frame to be read in from disk differs from the one currently displayed. If it does not differ, element 82 simply accumulates the time spent in the currently displayed section of the movie.

If it does differ, element 70 initiates the process of reading a new image frame off the hard disk into RAM. (If synchronized audio is being playing in conjunction, that data is read into memory as well.) Element 72 decompressed the previously read-in JPEG-compressed image frame using a suitably-fast commercially available decompressor that converts a JPEG image to a bitmap such as is produced by Pegasus Imaging, Tampa Fla. Element 74 sends the decompressed image to the video module for display. Element 76 annotates the movie by updating the status bar and graphics legends based upon the current location within the movie. Element 78 waits until the disk read previously initiated is complete. Element 80 takes audio data, if any, and cues it to be played by the computer's sound output module 24. Element 82 then simply accumulates the time spent in the currently displayed section of the movie.

Element 84 then causes this entire process to be repeated. (In typical embodiments, the movie will form an "infinite loop" where the movie's beginning is operationally contiguous with the movie's end.)

Music-Controlled Model Preferred Embodiment Operation

Overview

During operation, the particular embodiment described in block diagram FIG. B5, flowchart FIG. F6, and screenshot FIG. S4 functions in the following manner:

1) Element 100 continuously samples, digitizes and stores audio data from the microphone input module 40. Standard methods for doing this are readily available from many sources and functions to assist this are built into the Windows® operating system itself.

2) Element 102 processes this sampled audio into order to extract meaningful metrics. By "metrics", we mean numerical values that represent some acoustic element of interest from within the music. By "meaningful", we mean meaningful to the human listener. Examples of such metrics might be a list of energy levels in different frequency bands as calculated by a Fast Fourier Transform (an industry-standard transform), onsets of major volume changes as detected by derivatives calculated on a low-pass filtered version of the overall signal amplitude, etc.

3) Element 104 converts these metrics to a time within the movie in order that the movie evolve in response to the processed sound. For example, if the energy in the i'th frequency band of a four band Fourier Transform is denoted by "Ei" (where E1 represents energy in low frequencies and E4 energy in high ones) and "K" is a scaling constant, then time within the movie could be calculated by MovieTime =K(E1+2*E2 +4*E3+8*E4). In this way, if there is no ambient sound, MovieTime=0 and we see on display device 36 just the first (stationary) frame of the movie. As the overall amplitude of the ambient music increases, the time within the movie increases and the movie "plays"; as the overall volume then lessens, the movie plays backwards. In the particular scenario given, high-frequency notes cause greater changes in movie time than low frequency ones, and thus the movie races forward and back during high pitched loud/quiet passages.

Software Flowchart FIG. F6

FIG. F6 shows a software flowchart for the physical embodiment portrayed in block diagram FIG. B5 and screenshot FIG. S4. (In this music-responsive embodiment, typically Progress Bar 202, Graphics Overlay 204, and Current Location Indicator 206 are absent).

Description of Software Operation

The operation of this embodiment is similar to that described above in reference to the dial and button controlled embodiment detailed in flowchart FIG. F3. The primary difference is that the time determining the movie frame to be displayed is generated algorithmically in response to digitally-sampled music, rather than by use of a dial and button. Also, annotation in the form of graphic overlays and normal-rate playing of audio interleaved with video are both typically absent.

The functioning of software elements 100, 102, and 104, not present in the previously detailed software flowchart FIG. F3, have already been explained directly above.

An alternative embodiment, not so complex as to warrant a separate flowchart, but important enough to explicitly mention, is the situation in which the audio data to which the movie "dances" is made available to the music processing algorithms prior to its being sent to audio speakers. Such a scenario could occur by feeding an electrical music signal directly to the computer's microphone, or by having the audio data previously stored on the computer's hard drive 16.

In both scenarios, musical data would be sent to appropriate amplifiers and speakers a few seconds after the data was sent to the music processing algorithm. The reason to introduce such a delay is to permit the music processing algorithm information about what is to come in the music, in order that:

a) It may create more sophisticated movie time evolutions.

b) That these evolutions correspond to the macroscopic structure of the music.

c) That the music processing element may have the necessary computation time to insure the visual dynamic movie evolutions are synchronized with the playback of the acoustic music, without apparent and annoying delays that could occur without such a temporal buffer.

Note that Figures F7, S8 and G9 are adaptations of the above detailed mechanical and functional descriptions.

FIG. F7 shows the momentary pushbutton 26 being used to initiate display of a table of contents screen such as is shown in FIG. S8 which movie segment icons 114 and current position arrow 116. Software blocks 106, 108, 110, and 112 clearly indicate the functionality of this modification sufficiently that a person skilled in the relevant arts could program the described functionality without undo experimentation.

FIG. G9 shows a mouse cursor 118 traversing a substantially circular path 126 around a (virtual or visible) central point 122. The angle to be read is that formed by (virtual) lines 120 and 124. As above, the provided information is sufficient to allow a person skilled in the relevant arts to program the described functionality without undo experimentation.

CONCLUSION, RAMIFICATIONS, AND SCOPE OF INVENTION

Conclusion

Accordingly, the reader will see that the present movie display invention functions to present movies in a novel, educational, entertaining, cost-effective, and flexible manner. Using the present movie display invention, the normally passive experience of viewing a movie is transformed into a dynamic interactive event. The present movie display invention allows:

Time scales of enormous extent to be traversed and explored.

Video imagery containing arbitrary content, ranging from personal family scenes to natural phenomena to artistic imagery to be readily made to dance to music.

Eye-catching changeable kinetic signs to be presented cost-effectively.

Movie images to be perused by audiences with limited available viewing time and/or attention spans at arbitrarily accelerated rates.

The duration images are viewed by audiences to be readily tracked for purpose of advertising billing, entertainment level assessment, and educational analysis.

Public presenters to interactively locate movie information of interest to their audiences quickly and easily.

Throughout these traversal processes, video imagery is displayed in a manner free from undesirable visual artifacts or spurious inter-frame temporal jerks, drawbacks both frequently associated with high-speed and/or stop-frame movie traversal.

These and other desirable features of the present movie display invention have application to:

Entertainment.

Advertising.

Group Presentation.

Education.

Animation.

Scientific Visualization.

Direction-Providing.

Accident Reenactment.

Video Editing.

Gaming.

Art.

Ramifications and Scope

Although the descriptions above contains many specificities, these should not be construed as limiting the scope of the invention but as merely providing illustrations of some of the presently preferred embodiments of this invention. For example:

1) While the preferred embodiments described above rely on general purpose Intel processor-based microcomputers as the mediating element between the present movie display invention's visual display, its random access movie storage media, and its movie play-controlling input signals, it should be understood that other electronic, mechanical, optical, or similar devices may function in this mediating role. Specifically, for certain applications, a combination of semiconductor memory, microcontrollers, custom-programmed logic devices, and/or other such devices may be assembled and programmed without undue experimentation, by one skilled in the relevant arts, to perform the required mediating functions.

Similarly, new computation and control technologies may evolve, based on optical, biological, or other functional technologies, which would be suitable as well. Furthermore, while the particular microcomputer described is an Intel Pentium® II processor-based machine with serial and parallel ports, it should be understood that other microcomputers with other I/O ports are suitable as well. For example, Apple Corporation's iMac as sold by PC Connection, Marlow N.H., is apropriate. It would be a straightforward matter, for one skilled in the relevant arts, to locate or build adapter hardware to permit the described input devices including momentary pushbutton and rotary shaft encoder, to connect to the iMac via its Universal Serial Bus (USB) ports. A microphone input and audio speaker output is already included as part of the basic iMac system.

2) While the preferred embodiment show in FIG. B1 relies on the parallel port 20, serial port 22, quadrature to parallel port converter module 28, and quadrature optical shaft encoder 30, an industry-standard computer mouse plugged into computer 14's mouse port could function as an adequate replacement for these items. To enable this replacement, the dial 32 would be appropriately physically aligned and connected to one of the mouse's internal optical encoders by (for example) a piece of flexible tubing. Similarly, the circuit board mouse switch closure contacts could be wired to the external momentary pushbutton 26. Such modifications could be performed without undue experimentation by one skilled in the relevant arts.

Similarly, non-optical encoders (such as inductive encoders) may be used.

3) While the preferred embodiments described above rely on software algorithms running on a Pentium® processor to decompress the movie frame images, dedicated hardware cards may also be used. Such hardware is available from a wide range of vendors including Aurora Design (www.auroradsgn.com).

4) Audio headphones may be used instead of speakers.

5) Microphone input may be substituted with the playing of audio WAV files stored on hard disk, or with the playing of a CD, for the music-controlled embodiment.

6) An attract mode, possibly in the form of computer-generated music and resultant movie evolution, may be added to the music-controlled embodiment.

7) Many options for generation of metrics to drive the music-controlled embodiment exist. It is not our intent to limit the present movie display invention to relying on the particular example described above. Similarly, the ways in which such metrics may be converted to time evolution within the movie are many, and it is not our intent to limit the present movie display invention to relying on the particular example described above.

8) While a single dial input device has advantages in many applications, other movie-advance input devices may also be used such as:
   a) A linear finger-detecting strip, where the users finger may be repeatedly swept from (say) left-to-right.
   b) Pressure sensitive drum pads, where movie time position or advance rate is a function of the drum pressure. This is particularly applicable to instances where "playing" movies interactively like visual analogs of musical instruments is desired.
   c) Multiple dials where each dial causes a different rate of time-progression/frame-advance.
   d) Depression-sensing footpedals.
   e) Movie advance control systems that are placed at significant distances from the display, function through glass display windows, etc.
   f) Conventional touch screens with icon-explained movie-traverse options.
   g) Etc.

If a dial is used as the input device, it may be connected to external actuators such as a hanging pendulum, in order that time within the movie may advance based upon evolving dynamic systems.

9) The audio/movie-play activation button may be removed, or further buttons with additional functions may be added. For example, additional buttons might:
   a) Display a Table of Contents and dial-moveable screen highlight (such as an arrow) such that:
      i) Users knows where within the movie segments they are currently located.
      ii) Users can drop into a new spot within the same or a new movie segment by turning the dial until the screen arrow points to the desired location within the Table of Contents.
   b) Display advertiser contact information for the movie segment being viewed.
   c) Directly email or phone the advertiser for the movie being viewed.
   d) Etc.

10) Audio data may be stored on a different physical hard disk than video imagery, in order that both types of data may be accessed in parallel for increased speed of operation under certain circumstances.

In summary of the items above, it is not our intent to limit the present movie display invention to implementation on a particular set of mediating hardware, but rather, the scope of the invention should be determined by the appended claims and their legal equivalents.

11) Similarly, as regards view-time controlling software, operating systems (if used), and methods for storing and optionally compressing movies, it is not our intent to limit the present movie display invention to implementation using a particular set of software algorithms, but rather, the scope of the invention should be determined by the appended claims and their legal equivalents. Thus:
    a) While in our preferred embodiments above, we use (M)JPEG-compressed/decompressed individual movie frames, selected other available compression techniques (or in certain applications no compression at all) would function adequately also. The requirement on any compression/decompression scheme used is that, when implemented in its chosen hardware, it allows uncompressing and viewing an arbitrarily selected image from within the movie, or an image visually virtually indistinguishable from the selected image, in less of a time period than would typically be of annoyance to a human viewer. (For many contexts and viewers, this threshold is approximately 1/30 of a second.) MPEG, another industry-standard compression technique that does inter-frame as well as intra-frame compression, may have the ability to be modified to perform the required function was well. It is expected that such modification would including varying the density of MPEG key "I" frames, where the total amount of image change between I frames remained constant. Thus, to show a movie frame at a selected time, one would back up to the most recent I frame and decompress from that point to the desired image time. This scenario would have the advantage of very economical movie storage.

b) While in the preferred embodiments above we associate with each movie segment frame-cluster a header data block containing the number frames and their separation time, we could instead store a high-precision time stamp attached to each image frame in order to determine the appropriate moment for its display. Many other such formats would function adequately as well.

c) Regarding the timeline, graphic legends, etc., many presentations other than those shown in FIG. S4 are possible. For example:
   i) A list of advertisers or sponsors may appear during transitions between one movie segment and the next.
   ii) Movie segment may be named and alphabetized, and with these names scrolled across the screen as the movie plays.
   iii) Etc.

d) The relationship of dial-based movie-time advance may have a variety of different functional relationships to the movement of the dial and to the current location within the movie. Examples include simply position proportionality, velocity proportionality, "ratcheting" time only forwards or only backwards, sensitivity proportional to the temporal frame spacing within the current movie segment, and many other complex functional relationships.

e) The affect of pressing momentary pushbutton 26 may affect the playing of the audio and video components of the movie in different ways. For example, depression of the button within a specified frame range may play an audio track that explains all visual imagery seen within that frame range, while having the displayed video imagery be controlled by the rotation of dial 32.

f) For applications to gaming, clues may be buried within vast amounts of movie imagery, and the user's efforts to find these clues timed and a score attributed thereto.

g) While in the preferred embodiments above, movie advance was based on the rotation of a dial or algorithmically-processed music, the present movie display invention should not be construed to be limited to these two examples. Other input options of importance exist and include:
   i) Environmental sensor signal outputs. For example, time progression of a movie could advance proportional to the temperature in the room.
   ii) Mathematical equations. It is a straightforward matter, for example, to use equations such as MovieTime=A+Bsin(Ct) where "A", "B" and "C" are constants and "t" is the actual (viewer-perceived) time, to cause the movie to advance/retreat. Furthermore, such equation-dependent time progressions may have their parameters affected by user controls or environmental input.

h) Audio may be connected with video in various ways. Already discussed are the options of audio synched with video and both playing at the normal rate, audio narration playing in parallel with but independently from dial-controlled video, and no audio at all. An additional option is to play audio at the same (warbling) rate at which the (dial-controlled) video plays. Others options are possible as well.
   i) While in the above embodiment, the total time spent in each movie segment was stored, this is only one possibility. In other embodiments, one might wish to store each entry into a given segment, and the time the visitor remained there, in order that a histogram of frequency of entrance into a given segment vs. the time spent therein might be graphed and examined.

In summary of the items above, it is not our intent to limit the present movie display invention to implementation via a particular set of software algorithms and user interface elements, but rather, the scope of the should be determined by the appended claims and their legal equivalents.

I claim:

1. A movie presentation system comprising:
   (a) mass data storage means for providing substantially random access to movie data;
   (b) image display means for viewing temporal progression of movie image frames;
   (c) data transfer means for transferring data from said mass storage means to said display means wherein said data transfer means provides means for visually-clear temporally-smooth movie viewing over substantially arbitrary movie frame sequences, where said substantially arbitrary movie frame sequences may be generated continuously and spontaneously at view-time;
   (d) frame sequence generation means for generating temporal sequences of movie frames for display on said display means;

said system providing means for attracting, entertaining, informing, and educating through the fluid and engaging alteration of the rate and manner of travel through a movie.

2. A system as claimed in claim 1 wherein:
   (a) individual movie image frames contain substantially equal to or greater than the VHS standard of visual information content and clarity and said frames are;
   (b) substantially presented with equal to or less than the VHS standard inter-frame time delay;
   thus allowing movies to be presented typically with presentation quality substantially equal to, or greater than, VHS videotape viewed on typical VCR and TV hardware.

3. A system as claimed in claim 1 wherein said system's movie transfer means includes means for transferring movie data from said system's mass storage means to said system's image display means in small chunks, typically one movie frame, thus minimizing undesirable inter-frame temporal viewing delays.

4. A system as claimed in claim 1 wherein movie image data stored on said system's mass storage means is in compressed form, allowing relatively great quantities of movie content to be stored on said system's mass storage means.

5. A system as claimed in claim 4 wherein compressed movie image data is decompressed using a general purpose computer, avoiding the requirement of specialized hardware for said decompression.

6. A system as claimed in claim 5 wherein:
(a) individual movie image frames contain substantially equal to or greater than the VHS standard of visual information content and clarity and said frames are;
(b) substantially presented with equal to or less than the VHS standard inter-frame time delay;
thus allowing movies to be presented typically with presentation quality substantially equal to, or greater than, VHS videotape viewed on typical VCR and TV hardware.

7. A system as claimed in claim 5 wherein said system's movie transfer means includes means for transferring movie data from said system's mass storage means to said system's image display means in small chunks, typically one movie frame, thus minimizing undesirable inter-frame temporal viewing delays.

8. A system as claimed in claim 5 with means for accessing movie data on the mass data storage means in parallel with required movie decompression, minimizing inter-frame temporal delays.

9. A system as claimed in claim 5 wherein said system's frame sequence generation means includes an attract mode comprising:
(a) means for determining a movie presentation activity level;
(b) means for storing a pre-specified movie presentation activity threshold;
(c) means for accumulating contiguous elapsed idle time spent below said movie presentation activity threshold;
(d) means for storing a pre-specified number of seconds of allowed sub-threshold movie presentation activity, whereby thereafter an attract mode is entered;
(e) means for activating a relatively autonomous movie frame sequence-generating attract-mode sub-process if said pre-specified number of seconds of sub-threshold movie presentation activity are exceeded;
(f) a reset means for exiting said attract-mode sub-process if the movie presentation activity level would have exceeded said pre-specified movie presentation activity threshold, were said attract-mode to have been idle;
attracting the attention of passersby to said movie presentation system during low-input-stimulus operating periods.

10. A system as claimed in claim 5 wherein said system's frame sequence generation means comprises:
(a) a common point-and-click device such as a computer mouse;
(b) computer software means for tracking rotary movement of said point-and-click device around a central point;
(c) algorithmic means for determining the angle swept out by said rotary movement;
(d) conversion means for converting said angle to a frame within movie image data;
utilizing natural rotary motions of existing pointing devices to allow the fine control and essentially infinite dynamic range otherwise typically requiring special rotary dials.

11. A system as claimed in claim 5 wherein said system's frame sequence generation means comprises:
(a) rotary dial means for controlling advance through a movie;
(b) rotary measurement means for generating an output that allows the reading of said rotary dial means' angular position;
(c) interface means for connecting said rotary measurement means output to said system's frame sequence generation means;
(d) conversion means within said system's frame sequence generation means for converting said rotary dial's angular position reading to a frame within movie image data;
advance through movies being controlled by rotary motion of said rotary dial means.

12. A system as claimed in claim 5 wherein said system's frame sequence generation means comprises:
(a) music analysis means for extracting human-relevant information from musical pieces;
(b) movie frame sequence generation means for generating temporal sequences of movie frames from said extracted human-relevant information;
allowing movie image progression to occur in discernable connection to said musical pieces.

13. A system as claimed in claim 5 wherein said system includes:
(a) frame sequence generation means that include means for moving through movie frames at standard VHS frame rates and;
(b) audio playing means for playing audio interleaved with movie image data synchronized to presented images in the standard manner;
allowing movies to be played with accompanying audio in the standard manner.

14. A system as claimed in claim 4 wherein said system's movie transfer means includes means for transferring movie data from said system's mass storage means to said system's image display means in small chunks, typically one movie frame, thus minimizing undesirable inter-frame temporal viewing delays.

15. A system as claimed in claim 4 with means for accessing movie data on the mass data storage means in parallel with required movie decompression, thus minimizing inter-frame temporal delays.

16. A system as claimed in claim 4 wherein said system's frame sequence generation means includes an attract mode comprising:
(a) means for determining a movie presentation activity level;
(b) means for storing a pre-specified movie presentation activity threshold;
(c) means for accumulating contiguous elapsed idle time spent below said movie presentation activity threshold;
(d) means for storing a pre-specified number of seconds of allowed sub-threshold movie presentation activity, whereby thereafter an attract mode is entered;
(e) means for activating a relatively autonomous movie frame sequence-generating attract-mode sub-process if said pre-specified number of seconds of sub-threshold movie presentation activity are exceeded;

(f) a reset means for exiting said attract-mode sub-process if the movie presentation activity level would have exceeded said pre-specified movie presentation activity threshold, were said attract-mode to have been idle;

attracting the attention of passersby to said movie presentation system during low-input-stimulus operating periods.

17. A system as claimed in claim 4 wherein said system's frame sequence generation means comprises:

(a) a common point-and-click device such as a computer mouse;

(b) computer software means for tracking rotary movement of said point-and-click device around a central point;

(c) algorithmic means for determining the angle swept out by said rotary movement;

(d) conversion means for converting said angle to a frame within movie image data;

utilizing the natural rotary motions of existing pointing devices to allow the fine control and essentially infinite dynamic range otherwise typically requiring special rotary dials.

18. A system as claimed in claim 4 wherein said system's frame sequence generation means comprises:

(a) rotary dial means for controlling advance through a movie;

(b) rotary measurement means for generating an output that allows the reading of said rotary dial means' angular position;

(c) interface means for connecting said rotary measurement means output to said system's frame sequence generation means;

(d) conversion means within said system's frame sequence generation means for converting said rotary dial's angular position reading to a frame within movie image data;

advance through movies being controlled by rotary motion of said rotary dial means.

19. A system as claimed in claim 4 wherein said system's frame sequence generation means comprises:

(a) music analysis means for extracting human-relevant information from musical pieces;

(b) movie frame sequence generation means for generating temporal sequences of movie frames from said extracted human-relevant information; allowing movie image progression to occur in discernable connection to said musical pieces.

20. A system as claimed in claim 4 wherein said system includes a table of contents mode comprising:

(a) user control means for allowing users to enter said table of contents mode;

(b) user control means for allowing users to select movie locations quickly from within said table of contents;

(c) user control means for allowing users to exit said table of contents;

(d) means for changing the displayed movie frame to that specified by user actions within the table of contents;

allowing available movie segments to be immediately accessed for perusal.

21. A system as claimed in claim 1 wherein said system's frame sequence generation means includes an attract mode comprising:

(a) means for determining a movie presentation activity level;

(b) means for storing a pre-specified movie presentation activity threshold;

(c) means for accumulating contiguous elapsed idle time spent below said movie presentation activity threshold;

(d) means for storing a pre-specified number of seconds of allowed sub-threshold movie presentation activity, whereby thereafter an attract mode is entered;

(e) means for activating a relatively autonomous movie frame sequence-generating attract-mode sub-process if said pre-specified number of seconds of subthreshold movie presentation activity are exceeded;

(f) a reset means for exiting said attract-mode sub-process if the movie presentation activity level would have exceeded said pre-specified movie presentation activity threshold, were said attract-mode to have been idle;

attracting the attention of passersby to said movie presentation system during low-input-stimulus operating periods.

22. A system as claimed in claim 1 wherein said system's frame sequence generation means comprises:

(a) a common point-and-click device such as a computer mouse;

(b) computer software means for tracking rotary movement of said point-and-click device around a central point;

(c) algorithmic means for determining the angle swept out by said rotary movement;

(d) conversion means for converting said angle to a frame within movie image data;

utilizing the natural rotary motions of existing pointing devices to allow the fine control and essentially infinite dynamic range otherwise typically requiring special rotary dials.

23. Point-and-click control means as claimed in claim 22 wherein the rate of advance of the movie is a substantially greater-than-linearly increasing function of the point-and-click control means rotational velocity, allowing movie segments to be finely-perused at slow speeds while at the same time allowing extremely fast traverses when desired.

24. A system as claimed in claim 1 wherein said system's frame sequence generation means comprises:

(a) rotary dial means for controlling advance through a movie;

(b) rotary measurement means for generating an output that allows the reading of said rotary dial means' angular position;

(c) interface means for connecting said rotary measurement means output to said system's frame sequence generation means;

(d) conversion means within said system's frame sequence generation means for converting said rotary dial's angular position reading to a frame within movie image data;

advance through movies being controlled by rotary motion of said rotary dial means.

25. Rotary dial control means as claimed in claim 24 wherein:

(a) The rate of advance of the movie is a monotonically-increasing function of the dial's rotational velocity and;

(b) is 0 when the dial's rotational velocity is 0;

thus providing the system user the experience of being in direct control of a movie's scene evolution.

26. A system as claimed in claim 1 wherein said system's frame sequence generation means comprises:

(a) music analysis means for extracting human-relevant information from musical pieces;

(b) movie frame sequence generation means for generating temporal sequences of movie frames from said extracted human-relevant information;

allowing movie image progression to occur in discernable connection to said musical pieces.

27. A system as claimed in claim 1 wherein said system includes means to accumulate and log amounts of time pre-specified movie segments are displayed on said system's image display means, allowing purchasing users to track the fraction of time specific movie segments are displayed.

28. A movie presentation apparatus comprising:

(a) a mass data storage device to provide substantially random access to movie data;

(b) a display device for viewing movies;

(c) computer hardware and software elements comprising:

operating system and supporting hardware to support data transfer from said mass storage device to said display device;

computer instructions to allow movies to be presented in a visually-clear temporally-smooth manner over substantially arbitrary movie frame sequences, including in situations where said arbitrary frame sequences are generated continuously and unpredictably during viewing;

at least one input device to allow control of the temporal evolution of stored movies;

attracting, entertaining, informing, and educating viewers by allowing fluid and engaging control of the manner in which movies are presented.

29. A movie presentation method comprising:

(a) accessing movie data from a mass data storage source;

(b) transferring said movie data to a display device wherein said data transfer:

preserves stored movie image frame quality;

occurs with sufficient speed to avoid intrusive inter-frame temporal delays;

maintains image frame quality and temporal continuity even in situations where movie frame sequences are non-deterministic and are generated at view-time;

(c) sensing changes of environment parameters and using those changes to control the presentation evolution of movies;

attracting, entertaining, informing, and educating viewers by the unique manner in which movie scenes temporally evolve.

\* \* \* \* \*